United States Patent
Nemoto et al.

(10) Patent No.: US 8,029,269 B2
(45) Date of Patent: Oct. 4, 2011

(54) BLOW AIR SUPPLY UNIT FOR BLOW MOLDING MACHINE

(75) Inventors: Satoru Nemoto, Yokohama (JP); Setsu Matsuhashi, Tokyo (JP); Kouji Maeda, Yokohama (JP); Nobuyuki Kato, Yokohama (JP); Etsuko Kato, legal representative, Kanagawa (JP)

(73) Assignee: Toyo Seikan Kaisha, Ltd., Chiyoda-Ku, Tokyo (JP)

( * ) Notice: Subject to any disclaimer, the term of this patent is extended or adjusted under 35 U.S.C. 154(b) by 650 days.

(21) Appl. No.: 12/085,586

(22) PCT Filed: Dec. 13, 2006

(86) PCT No.: PCT/JP2006/324793
§ 371 (c)(1),
(2), (4) Date: Jul. 8, 2008

(87) PCT Pub. No.: WO2007/072716
PCT Pub. Date: Jun. 28, 2007

(65) Prior Publication Data
US 2009/0068305 A1    Mar. 12, 2009

(30) Foreign Application Priority Data
Dec. 21, 2005    (JP) .................................. 2005-368604

(51) Int. Cl.
*B29C 49/58*    (2006.01)

(52) U.S. Cl. ......................................... 425/526; 425/535
(58) Field of Classification Search ................... 425/526, 425/535
See application file for complete search history.

(56) References Cited

U.S. PATENT DOCUMENTS

| | | | |
|---|---|---|---|
| 3,233,416 A * | 2/1966 | Rainwater et al. ................... 62/5 |
| 4,790,741 A | 12/1988 | Takakusaki et al. |
| 5,035,931 A | 7/1991 | Yamada et al. |
| 5,266,020 A | 11/1993 | Peterson |
| 5,648,026 A | 7/1997 | Weiss |
| 5,962,039 A | 10/1999 | Katou et al. |
| 2004/0156942 A1 | 8/2004 | Schulze Uphoff et al. |

FOREIGN PATENT DOCUMENTS
JP    H01-133714    5/1989
* cited by examiner

*Primary Examiner* — Robert B Davis
(74) *Attorney, Agent, or Firm* — Manabu Kanesaka

(57) ABSTRACT

Inner surface strain of a container is reduced by suppressing a temperature drop of blow air, and heat resistance of the container is increased by enhancing the degree of crystallization. A blow air supply unit for a blow molding machine for molding a hollow bottle container 1 by supplying heated blow air into a preform includes: a high-pressure air source 11 for generating high-pressure blow air; a high-pressure gate valve 12 for opening/closing a blow air channel on the downstream of the high-pressure air source 11; a heat exchanger 13 for heating the blow air on the downstream of the high-pressure gate valve 12; a throttle valve 14 for throttling the flow rate of blow air on the downstream side of the heat exchanger 13; and a switchover valve 15 for switching the blow air on the downstream of the throttle valve 14.

7 Claims, 7 Drawing Sheets

EXHAUST AIR    COOLING AIR

PREFORM (CONTAINER)

COOLING AIR

EXHAUST AIR

HOT AIR

| PORT | BLOW MOLDING STEP | COOLING STEP |
|---|---|---|
| 1 | OPEN | CLOSE |
| 2 | CLOSE | OPEN |
| 3 | OPEN | OPEN |
| 4 | OPEN | OPEN |
| 5 | CLOSE | OPEN |

…

BLOW AIR SUPPLY UNIT FOR BLOW MOLDING MACHINE

TECHNICAL FIELD

The present invention relates to a blow air supply unit for a blow molding machine. In particular, this blow air supply unit can suppress a temperature drop of blow air and decrease a strain of an inner surface of a container. It is to be noted that the blow molding machine supplies heated blow air into a preform to mold a hollow container.

BACKGROUND ART

Containers manufactured by biaxial stretch blow molding are extensively spreading. As a material of the containers, a thermoplastic polyester is used. For example, containers made of polyethylene terephthalate (PET) have excellent transparency or surface glaze, and also includes impact resistance, rigidity, gas barrier properties, and others required for liquid containers. Therefore, the containers are extensively utilized as containers for beverages, seasonings, and others.

A biaxial stretch blow molding method usually has a supply step, a blow molding step, a cooling step, a release step, and others (see, e.g., Patent Documents 1 and 2). Hence, the above containers are manufactured through these steps.

At the supply step, a previously heated preform is supplied into an opened mold. Furthermore, after the preform is supplied, the mold is closed.

At the blow molding step, heated blow air is supplied into the preform while a stretch rod is stretching the preform in an axial direction. As a result, the preform is expanded and stretched in a circumferential direction. The biaxially stretched preform comes into contact with a cavity surface of the mold to define its shape as a container.

At the cooling step, the biaxially stretched container is cooled. Usually, cooling air is supplied into the container to effect cooling.

At the release step, the molded container is taken out from the mold. At this time, for example, the stretch rod is retracted and the mold is opened.

FIG. 13 is a block diagram showing a blow air supply unit for a blow molding machine according to a conventional example.

As shown in this drawing, the blow air supply unit usually includes a high-pressure air source 101, a high-pressure gate valve 102, a heat exchanger 103, a switchover valve 104, and others. This blow air supply unit supplies heated blow air into a preform.

The high-pressure air source 101 generates blow air having a high pressure (e.g., 4 MPa).

The high-pressure gate valve 102 is provided on a downstream side of the high-pressure air source 101, and opens/closes a blow air channel. The high-pressure gate valve 102 is usually a high-pressure solenoid valve. An opening/closing operation of this high-pressure solenoid valve in a high-pressure air channel is assured.

The heat exchanger 103 is provided on a downstream side of the high-pressure gate valve 102 to heat blow air.

The switchover valve 104 is provided on a downstream side of the heat exchanger 102 to switch the blow air channel or a cooling air channel. A temperature gauge 105 measures a temperature of blow air at an outlet of the heat exchanger 103.

It is to be noted that cooling air is supplied from a high-pressure air source 106 for cooling air.

FIG. 14 is an explanatory drawing showing a switchover pattern of the switchover valve.

As shown in this drawing, the switchover valve 104 has a plurality of (e.g., five) ports. The switchover valve 104 opens/closes these ports to supply blow air or cooling air. For example, it opens ports 1, 3, and 4 and closes ports 2, and 5 at a blow molding step. When such an operation is performed, heated blow air is supplied into a preform (a container). Further, this valve opens the ports 2 to 5 and closes the port 1 at a cooling step. When such an operation is performed, cooling air is supplied into the container.

Patent Document 1: Japanese Patent Application Laid-open No. 133714-1989

Patent Document 2: Japanese Patent Application Laid-open No. 74319-1990

DISCLOSURE OF THE INVENTION

Problem to be Solved by the Invention

FIG. 15 is an explanatory drawing showing a temperature change pattern in a blow air supply unit for a blow molding machine according to a conventional example.

As shown in this drawing, in the blow air supply unit for the blow molding machine according to the conventional example, a temperature of blow air at an outlet of a heat exchanger 103 rapidly drops immediately after starting a blow molding step. For example, when a set temperature for heating blow air by the heat exchanger is 180° C., the temperature of the blow air rapidly drops to approximately 100° C. That is because a heated air storage capacity of the heat exchanger is small. That is, when the heated air in the heat exchanger is supplied after starting blow, the blow air which has flowed into the heat exchanger passes through the heat exchanger in a short time and is supplied without being sufficiently heated.

When the temperature of the blow air rapidly drops immediately after starting blow, an inner surface of the container strains. Further, there is also a possibility that crystallization may become insufficient and heat resistance of the container may be lowered.

It is to be noted that a blow air channel having a reducing valve and a blow air channel having no reducing valve are provided in parallel in Patent Document 2. These channels are switched at a primary blow step and a secondary blow step. However, the purpose of this channel switch is simply changing a blow air supply pressure, and a temperature change pattern of blow air is not considered.

The present invention takes the above-explained situation into consideration. That is, it is an object of the present invention to provide a blow air supply unit for a blow molding machine that can decrease a strain of an inner surface of a container by suppressing a temperature drop of blow air, and improve heat resistance of a container by increasing a degree of crystallization.

Means for Solving the Problem

To achieve this object, a blow air supply unit for a blow molding machine according to the present invention, which supplies heated blow air into a preform to mold a hollow container, comprises: a high-pressure air source which generates blow air having a high pressure; a high-pressure gate valve which opens/closes a blow air channel on the downstream side of the high-pressure air source; a heat exchanger which heats the blow air on the downstream side of the high-pressure gate valve; a throttle valve which throttles a blow air flow rate on the downstream side of the heat exchanger; and a switchover valve which switches the blow air channel on the downstream side of the throttle valve.

When such a configuration is adopted, a flow rate of blow air is controlled by the throttle valve on the downstream side of the heat exchanger. That is, since a time required for the blow air to pass through the heat exchanger becomes long, the blow air having a high temperature can be supplied for a long time.

As a result, a temperature drop of the blow air immediately after blow can be suppressed, and a strain of an inner surface of the container can be reduced. Furthermore, since the blow air reaches a sufficient crystallization temperature, heat resistance of the container can be improved.

Moreover, a blow air supply unit for a blow molding machine according to the present invention, which supplies heated blow air into a preform to mold a hollow container, comprises: a high-pressure air source which generates blow air having a high pressure; a heat exchanger which heats the blow air on the downstream side of the high-pressure air source; a high-pressure gate valve which opens/closes a blow air channel on the downstream side of the heat exchanger; and a switchover valve which switches the blow air channel on the downstream side of the high-pressure gate valve.

When such a structure is provided, a pressure in the heat exchanger is increased by the high-pressure gate valve. That is, since an amount of heated blow air stored in the heat exchanger is increased, the blow air having a high temperature can be supplied for a long time.

As a result, a temperature drop of the blow air immediately after starting blow can be suppressed, and a strain of an inner surface of the container can be reduced. Additionally, since the blow air reaches a sufficient crystallization temperature, heat resistance of the container can be improved.

Further, it is preferable to provide a throttle valve which throttles a blow air flow rate between the high-pressure gate valve and the switchover valve.

When such a structure is adopted, a flow rate of the blow air is controlled on the downstream side of the heat exchanger, and an amount of the heated blow air that is stored in the heat exchanger is increased. Therefore, the blow air having a high temperature can be supplied for a long time.

Furthermore, it is preferable that a first gate channel provided with the high-pressure gate valve and the throttle valve in series, and a second gate channel provided with the high-pressure gate valve are arranged in parallel between the heat exchanger and the switchover valve.

When such a structure is adopted, switching the first gate channel and the second gate channel enables changing a flow rate or a temperature of the blow air in an arbitrary pattern.

Moreover, it is preferable to switch the first gate channel and the second gate channel in such a manner that the blow air is supplied through the first gate channel on an initial stage of blow and then the blow air is supplied through the second gate channel.

When such a structure is adopted, the blow air having a high temperature can be supplied for a long time on the initial stage of blow. Additionally, then, a flow rate of the blow air can be increased to shorten a molding cycle.

Further, it is preferable to provide a second heat exchanger which heats the blow air between the high-pressure gate valve and the switchover valve or between the throttle valve and the switchover valve. When such a structure is provided, since the first heat exchanger that performs high-pressure heating (pre-heating) with respect to the blow air and the second heat exchanger that performs normal-pressure heating with respect to the blow air are arranged in series, the blow air having a high temperature can be supplied for a long time on the initial stage of blow. Furthermore, a temperature drop can be suppressed by heating on the two stages, and a temperature of the blow air can be increased at the entire blow step.

Moreover, a blow air supply unit for a blow molding machine according to the present invention, which supplies heated blow air into a preform to mold a hollow container, comprises: a first channel including a primary high-pressure air source which generates blow air having a high pressure and a high-pressure gate valve which opens/closes a blow air channel on the downstream side of the primary high-pressure air source; a second channel including a secondary high-pressure air source which generates blow air having a pressure higher than that of the primary high-pressure air source and a high-pressure gate valve which opens/closes the blow air channel on the downstream side of the secondary high-pressure air source; a heat exchanger which heats the blow air on the downstream side of the first channel and the second channel which are connected in parallel; and a switchover valve which switches the blow air channel on the downstream side of the heat exchanger, wherein the first channel and the second channel are switched in such a manner that the blow air is supplied through the first channel on an initial stage of blow and then the blow air is supplied through the second channel.

When such a structure is adopted, the blow air having a high temperature can be supplied for a long time on the initial stage of blow. Additionally, by subsequently increasing a pressure of the blow air, the preform which is in the blow molding process can be formed in a shape completely corresponding to a blow mold.

BEST MODE FOR CARRYING OUT THE INVENTION

Embodiments according to the present invention will now be explained hereinafter with reference to the drawings. However, known technologies are utilized for an entire structure of a blow molding machine, a manufacturing process for a biaxial-stretch-blow-molded container, a material and a shape of a preform, and others. Therefore, a detailed explanation thereof will be omitted.

First Embodiment

A blow air supply unit for a blow molding machine according to a first embodiment of the present invention will be first explained with reference to FIGS. 1 and 2.

Figure 1:
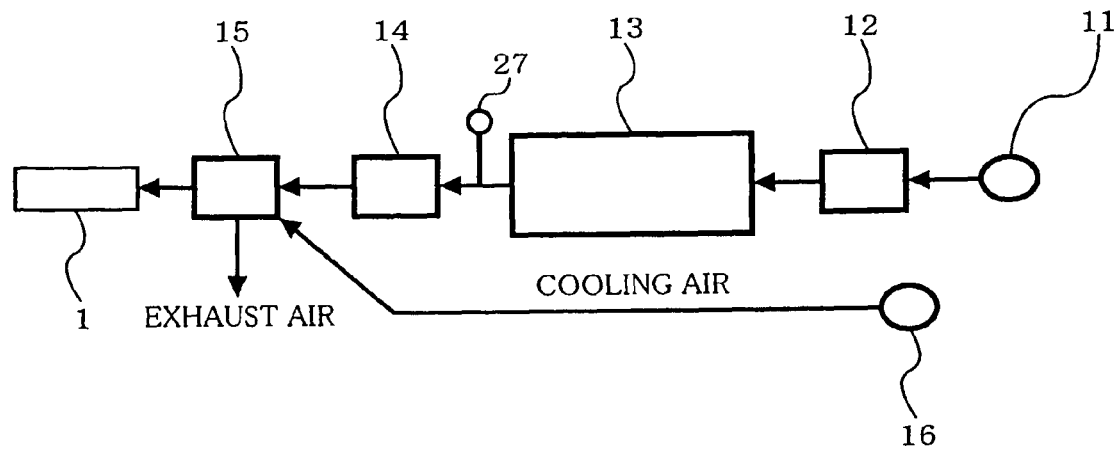
FIG. 1 is a block diagram showing a blow air supply unit for a blow molding machine according to a first embodiment of the present invention.

FIG. 1 is a block diagram showing the blow air supply unit for the blow molding machine according to the first embodiment of the present invention.

As shown in this drawing, the blow air supply unit for the blow molding machine according to the first embodiment of the present invention supplies heated blow air into a preform to mold a hollow bottle container 1. Further, this blow air supply unit includes a high-pressure air source 11, a high-pressure gate valve 12, a heat exchanger (a heater) 13, a throttle valve 14, a switchover valve 15, and a temperature gauge 27.

The high-pressure air source 11 generates blow air having a high pressure (e.g., 4 MPa).

The high-pressure gate valve 12 is provided on a downstream side of the high-pressure air source 11 and opens/closes a blow air channel. The high-pressure gate valve 12 is usually a high-pressure solenoid valve. An opening/closing operation of this high-pressure solenoid valve in the high-pressure air channel is guaranteed.

The heat exchanger 13 is provided on the downstream side of the high-pressure gate valve 12 and heats blow air.

The throttle valve 14 is provided on the downstream side of the heat exchanger 13. The throttle valve 14 throttles the blow air channel to control a flow rate of the blow air. As the throttle valve 14, a fixed throttle valve having a fixed flow rate is used. It is to be noted that a variable throttle valve capable of adjusting a flow rate may be used as the throttle valve 14.

The switchover valve 15 is provided on the downstream side of the heat exchanger 13 to switch the blow air channel or a cooling air channel. The temperature gauge 27 measures a temperature of the blow air at an outlet of the heat exchanger 13.

Figure 14:
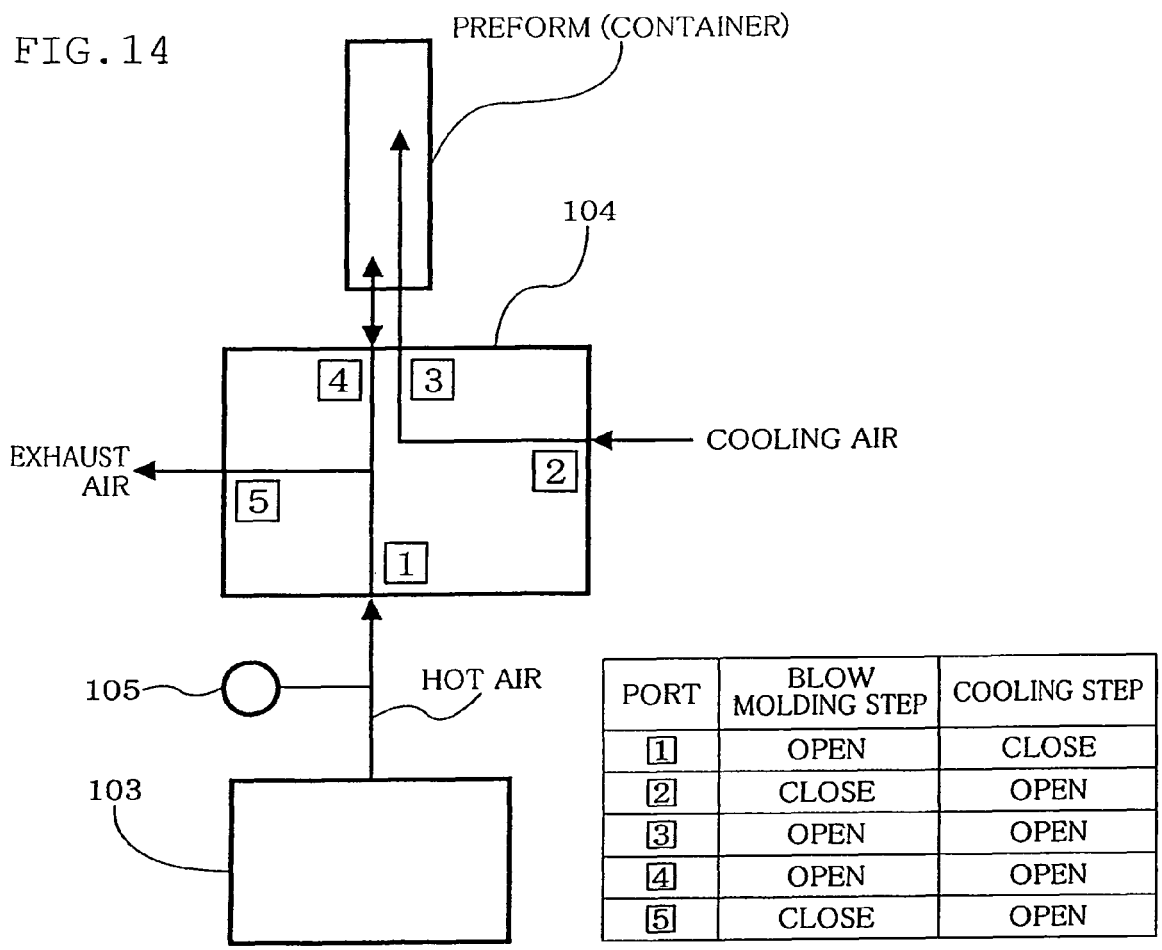
FIG. 14 is an explanatory drawing showing a switchover pattern of a switchover valve.
Figure 15:
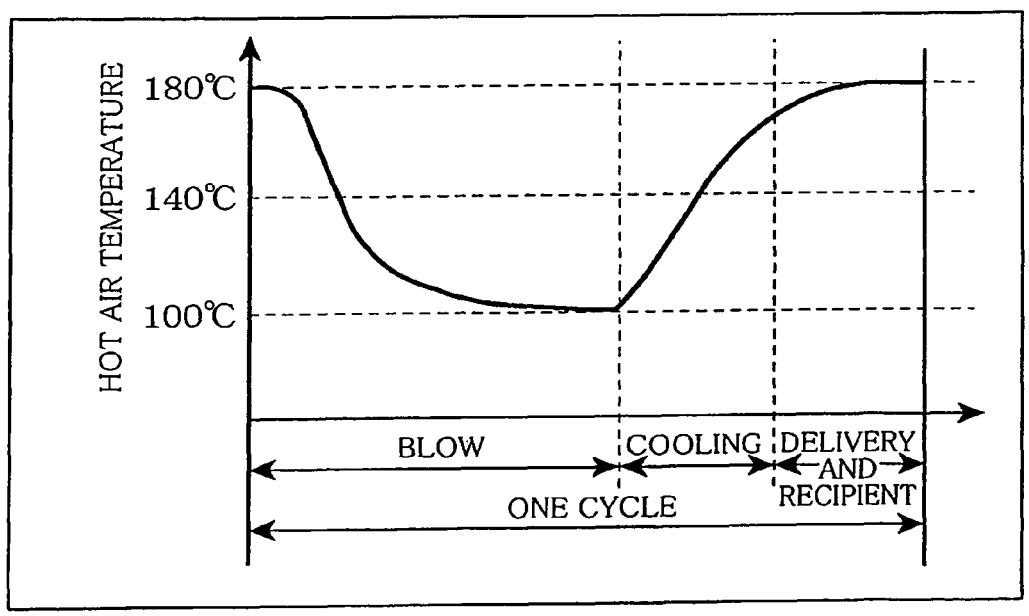
FIG. 15 is an explanatory drawing showing a temperature change pattern in the blow air supply unit for the blow molding machine according to the conventional example.

As the switchover valve 15 and the temperature gauge 27, members depicted in FIG. 14 can be used, for example.

It is to be noted that cooling air is supplied into the bottle container 1 from the a high-pressure air source 16 for cooling air through the switchover valve 15 to cool the inside of the bottle container 1 after blow molding.

Figure 2:
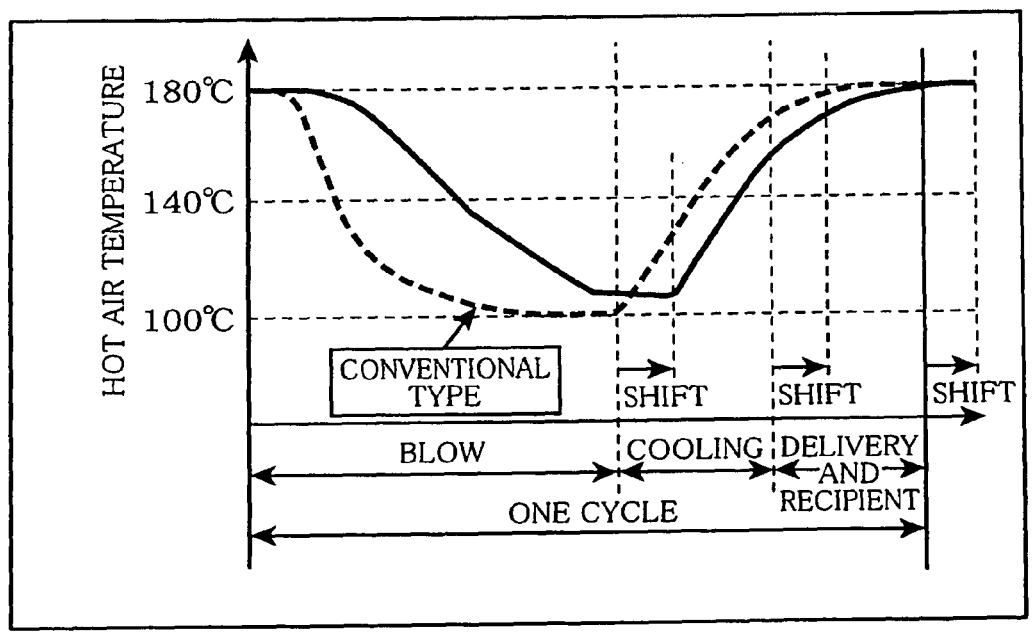
FIG. 2 is an explanatory drawing showing a temperature change pattern in the blow air supply unit for the blow molding machine according to the first embodiment of the present invention.

FIG. 2 is an explanatory drawing showing a temperature change pattern in the blow air supply unit for the blow molding machine according to the first embodiment of the present invention.

As shown in this drawing, in the blow air supply unit according to the first embodiment, a flow rate of the blow air is controlled on the downstream side of the heat exchanger 13 by providing the throttle valve 14 between the heat exchanger 13 and the switchover valve 15. Therefore, the blow air can be gradually supplied from the heat exchanger 13, and a time required for the blow air to pass through the heat exchanger 13 thereby becomes long, thus supplying the blow air having a high temperature for a long time. As a result, a temperature drop of the blow air immediately after starting blow can be suppressed, and a strain of an inner surface of the bottle container 1 can be reduced. Furthermore, a sufficient crystallization temperature can be assured, and heat resistance of the bottle container 1 can be improved.

However, in this embodiment, since a temperature drop of the blow air is suppressed by controlling a flow rate of the blow air, a blow air supply time is prolonged. As a result, a timing of cooling (a cooling step) or delivery and recipient (a release step, a supply step) may be shifted, and one cycle of molding may be possibly prolonged. However, since suppressing a temperature drop enables hastening temperature recovery of the blow air, a prolonged time can be reduced. Moreover, starting the next blow immediately after temperature recovery of the blow air enables application of this embodiment without prolonging one cycle.

Second Embodiment

A blow air supply unit for a blow molding machine according to a second embodiment of the present invention will now be explained with reference to FIGS. 3 and 4.

Figure 3:
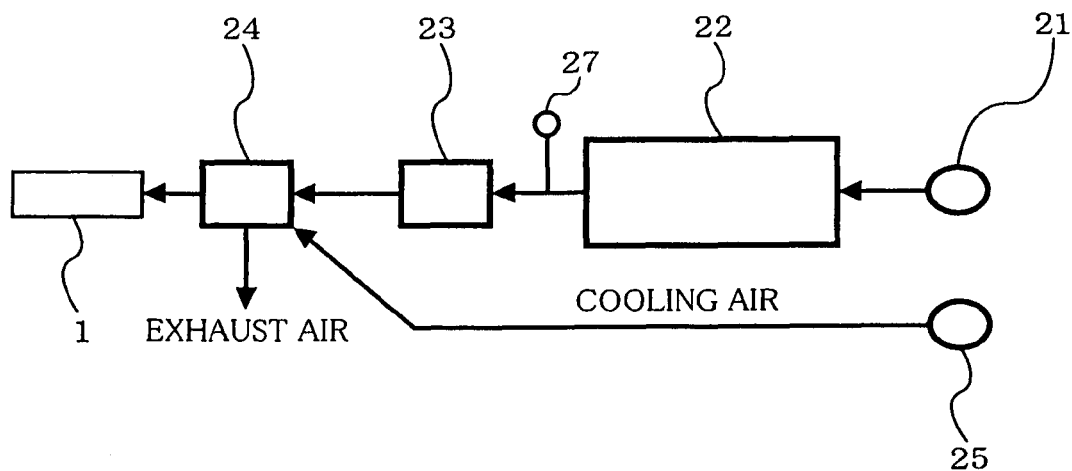
FIG. 3 is a block diagram showing a blow air supply unit for a blow molding machine according to a second embodiment of the present invention.

FIG. 3 is a block diagram showing the blow air supply unit for the blow molding machine according to the second embodiment of the present invention.

As shown in this drawing, the blow air supply unit for the blow molding machine according to the second embodiment of the present invention supplies heated blow air into a preform to mold a hollow bottle container 1. Additionally, this blow air supply unit includes a high-pressure air source 21, a heat exchanger 22, a high-pressure gate valve 23, a switchover valve 24, and a temperature gauge 27.

The high-pressure air source 21 generates blow air having a high temperature (e.g., 4 MPa).

The heat exchanger 22 is provided on a downstream side of the high-pressure air source 21 to heat the blow air.

The high-pressure gate valve 23 is provided on the downstream side of the heat exchanger 22 to open/close a blow air channel. As the high-pressure gate valve 23, a high-pressure solenoid valve is used. An opening/closing operation of this high-pressure solenoid valve in the high-pressure air channel is guaranteed, and the high-pressure solenoid valve has heat resistance against a blow air heating temperature or a higher temperature.

The switchover valve 24 is provided on the downstream side of the high-pressure gate valve 23 to switch the blow air channel or a cooling air channel. As the switchover valve 24, one shown in FIG. 14 can be used, for example.

It is to be noted that cooling air is supplied into the bottle container 1 from the high-pressure air source 25 for cooling air through the switchover valve 24.

Figure 4:
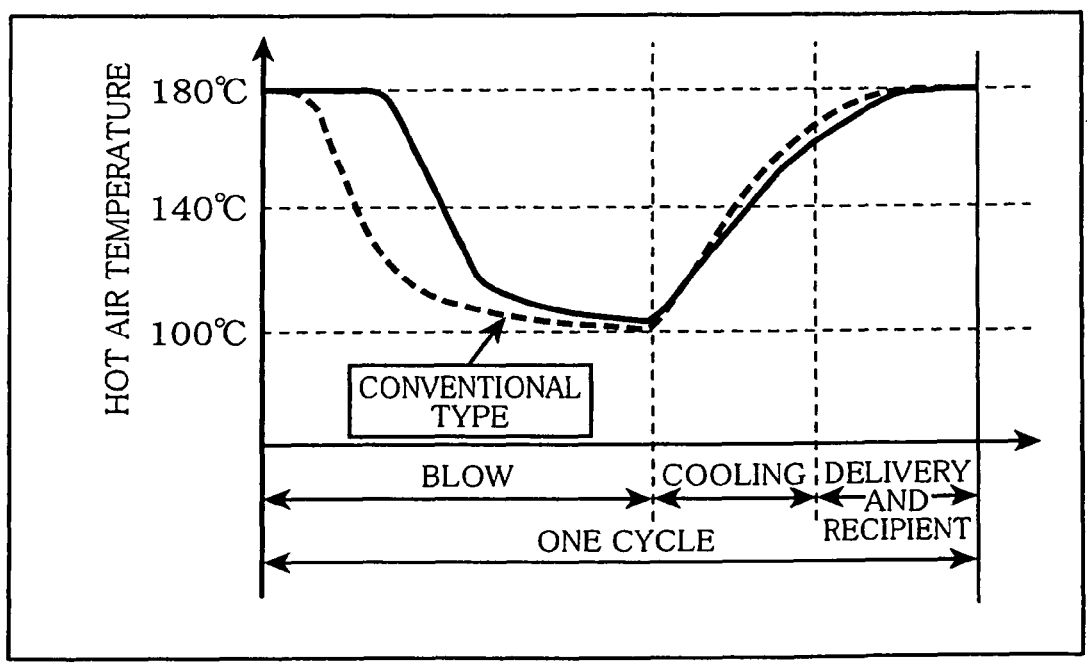
FIG. 4 is an explanatory drawing showing a temperature change pattern in the blow air supply unit for the blow molding machine according to the second embodiment of the present invention.

FIG. 4 is an explanatory drawing showing a temperature change pattern in the blow air supply unit for the blow molding machine according to the second embodiment of the present invention.

As shown in this drawing, in the blow air supply unit according to the second embodiment, the high-pressure gate valve 23 is provided on the downstream side of the heat exchanger 22 to increase a pressure in the heat exchanger 22. Therefore, an amount of the heated blow air in the heat exchanger 22 is increased, and the blow air having a high temperature can be supplied for a long time. As a result, a temperature drop of the blow air after starting blow can be suppressed, and a strain of an inner surface of the bottle container 1 can be reduced. Further, a sufficient crystallization temperature can be assured, and heat resistance of the bottle container 1 can be improved.

Third Embodiment

A blow air supply unit for a blow molding machine according to a third embodiment of the present invention will now be explained with reference to FIGS. 5 and 6. However, like reference numerals denote like structures in the second embodiment, and the explanation of the second embodiment is used.

Figure 5:
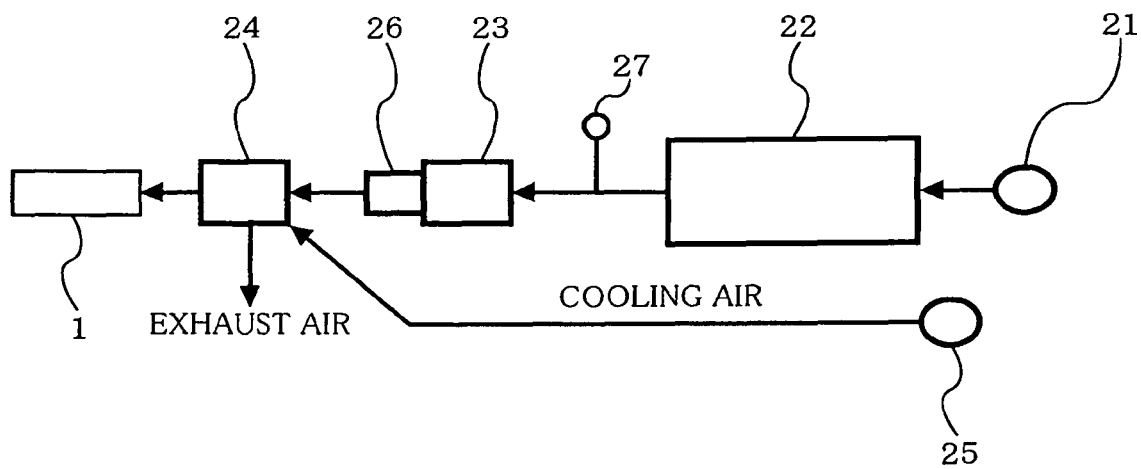
FIG. 5 is a block diagram showing a blow air supply unit for a blow molding machine according to a third embodiment of the present invention.

FIG. 5 is a block diagram showing the blow air supply unit for the blow molding machine according to a third embodiment of the present invention.

As shown in this drawing, the blow air supply unit for the blow molding machine according to the third embodiment of the present invention is different from the second embodiment in that a throttle valve 26, which throttles a blow air flow rate, is provided between a high-pressure gate valve 23 and a switchover valve 24. As the throttle valve 26, a fixed throttle valve having a fixed flow rate is used. It is to be noted that a variable throttle valve capable of adjusting a flow rate may be used as the throttle valve 26.

Figure 6:
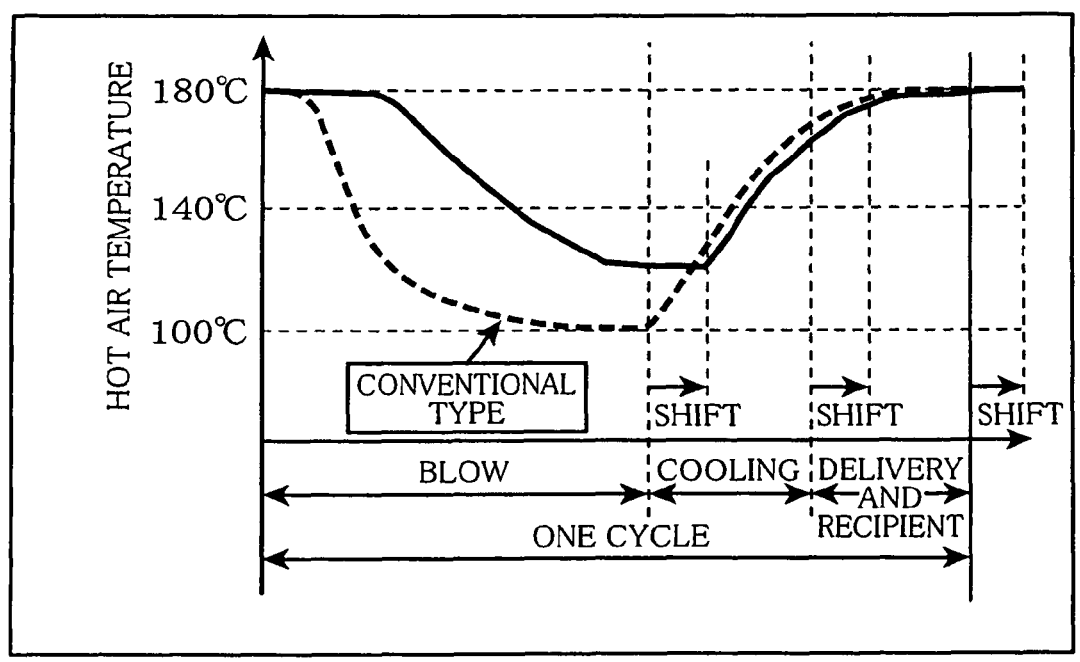
FIG. 6 is an explanatory drawing showing a temperature change pattern in the blow air supply unit for the blow molding machine according to the third embodiment of the present invention.

FIG. 6 is an explanatory drawing showing a temperature change pattern in the blow air supply unit for the blow molding machine according to the third embodiment of the present invention.

As shown in this drawing, in the blow air supply unit according to the third embodiment, like the second embodiment, the high-pressure gate valve 23 is provided on a downstream side of a heat exchanger 22 to increase a pressure in the heat exchanger 22. Therefore, an amount of the heated blow air in the heat exchanger is increased, and the blow air having a high temperature can be supplied for a long time.

Moreover, since the throttle valve 26 provided on the downstream side of the high-pressure gate valve 23 controls a flow rate of the blow air and a time required for the blow air to pass through the heat exchanger 22 thereby becomes long, the blow air having a high temperature can be supplied for a longer time.

However, in this embodiment, since a temperature drop of the blow air is suppressed by controlling a flow rate of the blow air, a blow air supply time is prolonged. As a result, a timing of cooling (a cooling step) or delivery and recipient (a release step, a supply step) may be shifted, and one cycle of molding may be possibly prolonged. However, since suppressing a temperature drop enables hastening temperature recovery of the blow air, the prolonged time can be shortened. Additionally, starting the next blow immediately after temperature recovery of the blow air enables applying this embodiment without prolonging one cycle.

Fourth Embodiment

A blow air supply unit for a blow molding machine according to a fourth embodiment of the present invention will now be explained with reference to FIGS. 7 and 8. However, like reference numerals denote like structures in the second and third embodiments, and the explanations of the second and third embodiments will be used.

Figure 7:
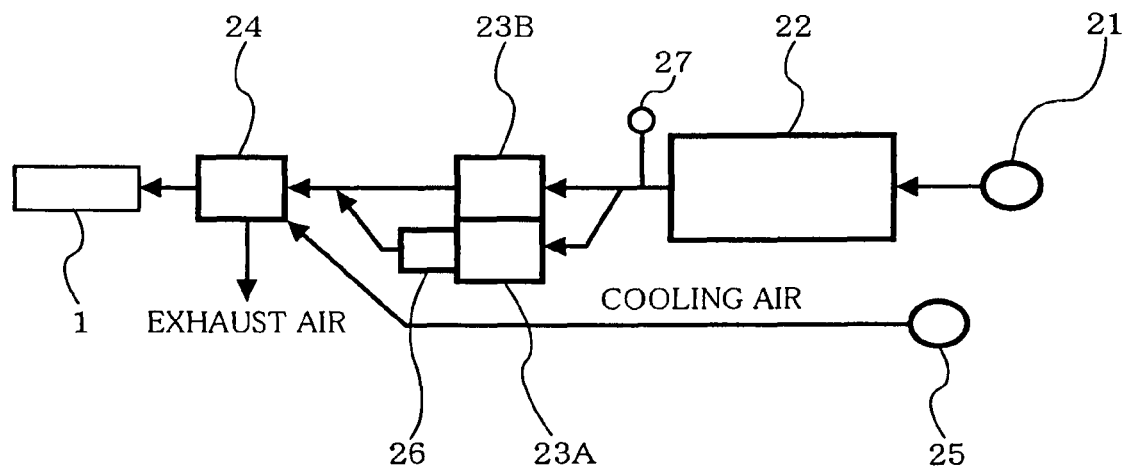
FIG. 7 is a block diagram showing a blow air supply unit for a blow molding machine according to a fourth embodiment of the present invention.

FIG. 7 is a block diagram showing the blow air supply unit for the blow molding machine according to the fourth embodiment of the present invention.

As shown in this drawing, the blow air supply unit for the blow molding machine according to the fourth embodiment of the present invention is different from the second and third embodiments in that a first gate channel provided with a high-pressure gate valve 23A and a throttle valve 26 in series, and a second gate channel provided with a high-pressure gate valve 23B alone are arranged in parallel between a heat exchanger 22 and a switchover valve 24.

When such a structure is adopted, switching the first gate channel and the second gate channel enables changing a flow rate or a temperature of blow air in an arbitrary pattern. In particular, it is preferable to gradually supply the blow air through the first gate channel on an initial stage of blow and then rapidly supply the blow air through the second gate channel.

It is to be noted that the first gate channel and the second gate channel are switched by switching the high-pressure gate valves 23A and 23B. However, the present invention is not restricted thereto. For example, a port 1 of the switchover valve 24 may diverge to enable switching, and these channels may be switched by switching this switchover valve 24.

Figure 8:
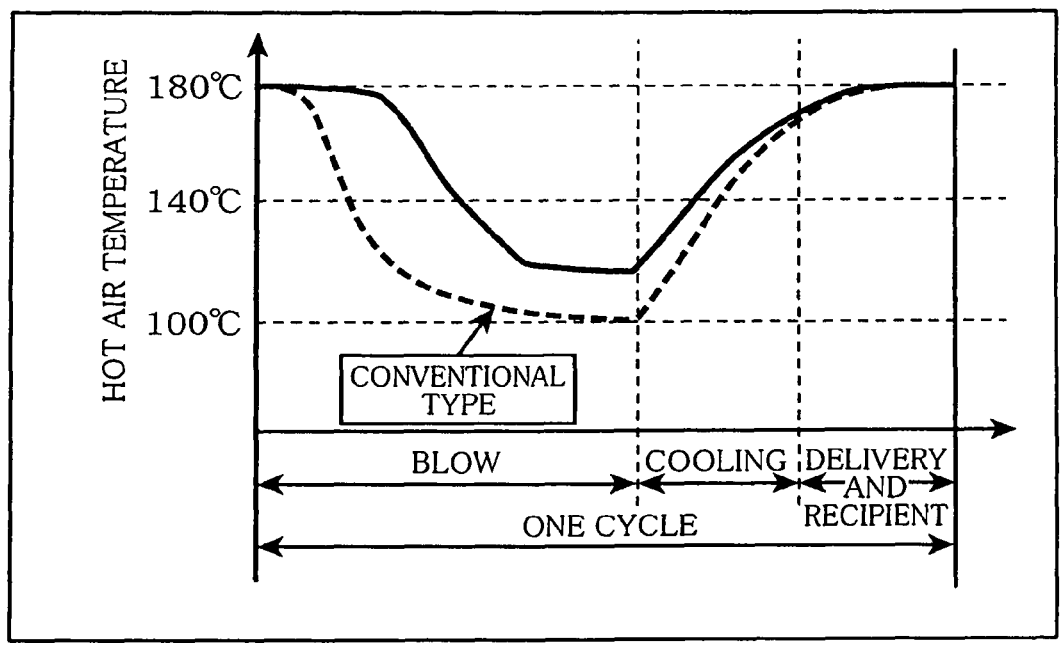
FIG. 8 is an explanatory drawing showing a temperature change pattern in the blow air supply unit for the blow molding machine according to the fourth embodiment of the present invention.

FIG. 8 is an explanatory drawing showing a temperature change pattern in the blow air supply unit for the blow molding machine according to the fourth embodiment of the present invention.

As shown in this drawing, in the blow air supply unit according to the fourth embodiment, the blow air is gradually supplied through the first gate channel on the initial stage of blow, for example. Then, the blow air is rapidly supplied through the second gate channel to mold a bottle container. In this case, the blow air having a high temperature can be supplied for a long time. Further, thereafter, a flow rate of the blow air can be increased, and a molding cycle can be shortened.

Fifth Embodiment

A blow air supply unit for a blow molding machine according to a fifth embodiment of the present invention will now be explained with reference to FIGS. 9 and 10. However, like reference numerals denote like structures in the second embodiment, and the explanation of the second embodiment will be utilized.

Figure 9:
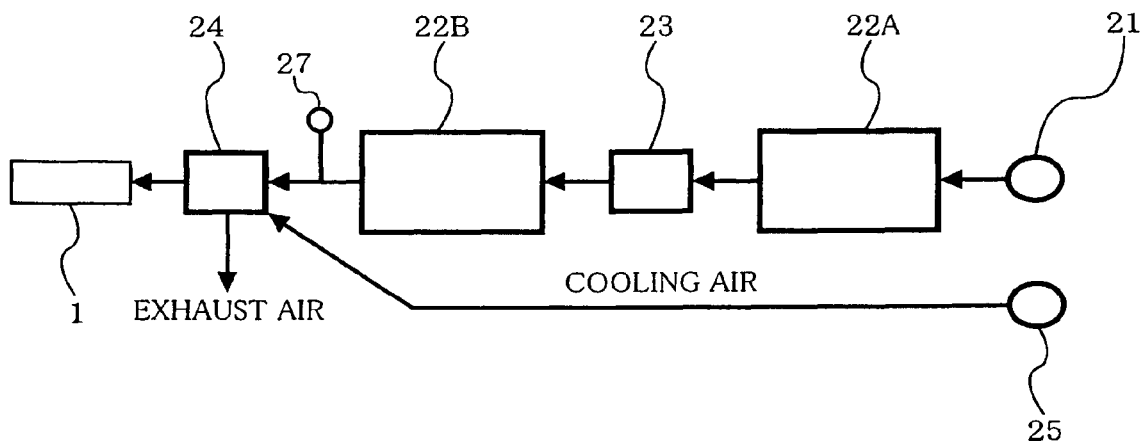
FIG. 9 is a block diagram showing a blow air supply unit for a blow molding machine according to a fifth embodiment of the present invention.

FIG. 9 is a block diagram showing the blow air supply unit for the blow molding machine according to the fifth embodiment of the present invention.

As shown in this drawing, the blow air supply unit for the blow molding machine according to the fifth embodiment of the present invention is different from the second embodiment in that a second heat exchanger 22B which heats blow air is provided between a high-pressure gate valve 23 and a switchover valve 24. As the second heat exchanger 22B, one equivalent to a first heat exchanger 22A can be used.

According to this embodiment, when an allowable temperature limit of the high-pressure gate valve 23 is lower than a desired blow temperature, first, the first heat exchanger 22A heats blow air to a temperature conforming to an allowable temperature limit specification of the high-pressure gate valve 23, and then the second heat exchanger 22B heats the blow air to a desired temperature.

It is to be noted that the second heat exchanger can be provided in a first gate channel and/or a second gate channel between the high-pressure gate valve 23 (23A, 23B) and the switchover valve 24 in the fourth embodiment. Further, the second heat exchanger can be provided on the downstream side of a confluence of the first gate channel and the second gate channel in the fourth embodiment.

Figure 10:
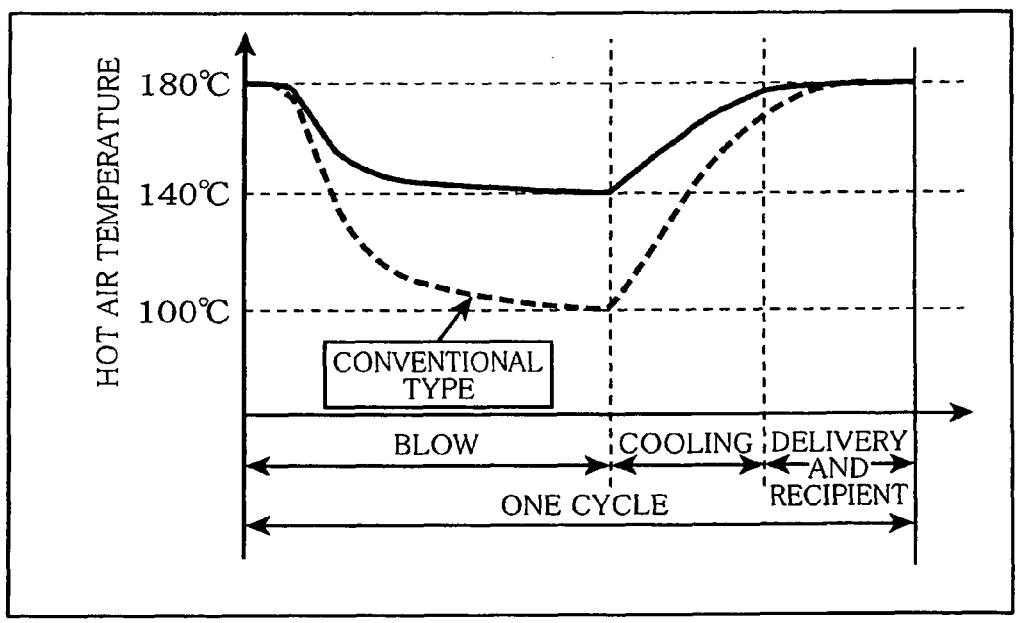
FIG. 10 is an explanatory drawing showing a temperature change pattern in the blow air supply unit for the blow molding machine according to the fifth embodiment of the present invention.

FIG. 10 is an explanatory drawing showing a temperature change pattern in a blow air supply unit for the blow molding machine according to the fifth embodiment of the present invention.

As shown in this drawing, in the blow air supply unit according to the fifth embodiment, like the second embodiment, the high-pressure gate valve 23 is provided on the downstream side of the first heat exchanger 22A to increase a pressure in the first heat exchanger 22A. Therefore, an amount of the heated blow air in the first heat exchanger 22A is increased, and the blow air having a high temperature can be supplied for a long time.

Furthermore, in this blow air supply unit, the second heat exchanger 22B that performs normal-pressure heating with respect to the blow air is arranged in series on the downstream side of the first heat exchanger 22A that carries out high-pressure heating (preheating) with respect to the blow air. Therefore, a temperature drop can be suppressed based on two-stage heating by the second heat exchanger 22B, thereby increasing a temperature of the blow air at the entire blow step.

Sixth Embodiment

A blow air supply unit for a blow molding machine according to a sixth embodiment of the present invention will now be explained with reference to FIGS. 11 and 12. However, like reference numerals denote like structures in the first embodiment, and the explanation of the first embodiment will be utilized.

Figure 11:
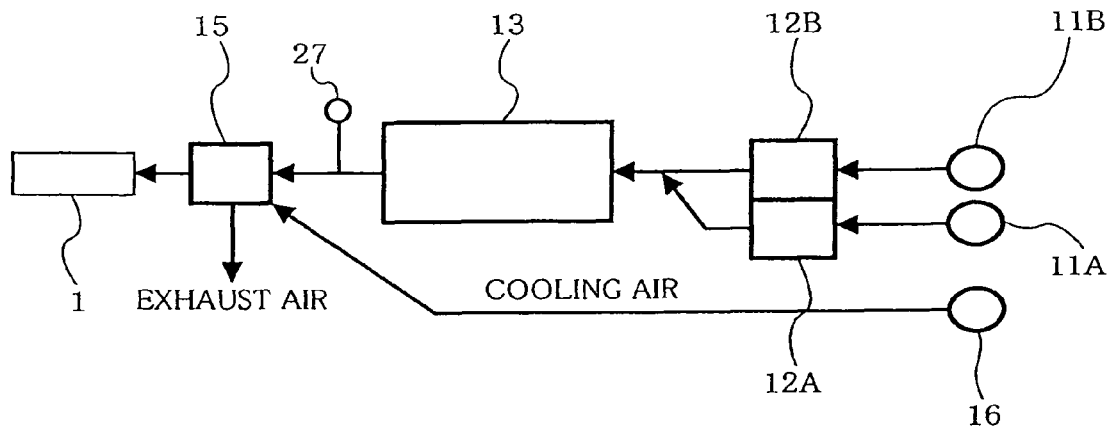
FIG. 11 is a block diagram showing a blow air supply unit for a blow molding machine according to a sixth embodiment of the present invention.

FIG. 11 is a block diagram showing the blow air supply unit for the blow molding machine according to the sixth embodiment of the present invention.

As shown in this drawing, the blow air supply unit for the blow molding machine according to the sixth embodiment of the present invention is different from the first embodiment in that a first channel and a second channel which are connected with a heat exchanger 13 in parallel are provided on an upstream side of the heat exchanger 13 in place of providing the throttle valve 15 between the heat exchanger 13 and the switchover valve 15 in the first embodiment.

The first channel includes a primary high-pressure air source 11A and a high-pressure gate valve 12A that opens/closes a blow air channel on a downstream side of this primary high-pressure air source 11A. Moreover, the second channel includes a secondary high-pressure air source 11B and a high-pressure gate valve 12B that opens/closes the blow air channel on a downstream side of this secondary high-pressure air source 11B.

The secondary high-pressure air source 11B has a pressure higher than that of the primary high-pressure air source 11A, and generates blow air having a high pressure (e.g., 4 MPa) required for blow molding. On the other hand, the primary high-pressure air source 11A generates blow air having a high pressure, but this pressure is set to be relatively lower than that of the secondary high-pressure air source 11B.

When such a structure is adopted, switching the first channel and the second channel enables gradually supplying the blow air through the first channel on the initial stage of blow. Additionally, then, a blow air pressure required to form a preform in a shape corresponding to a blow mold can be supplied through the second channel.

It is to be noted that the first channel and the second channel are switched by switching the high-pressure gate valves 12A and 12B.

Figure 12:
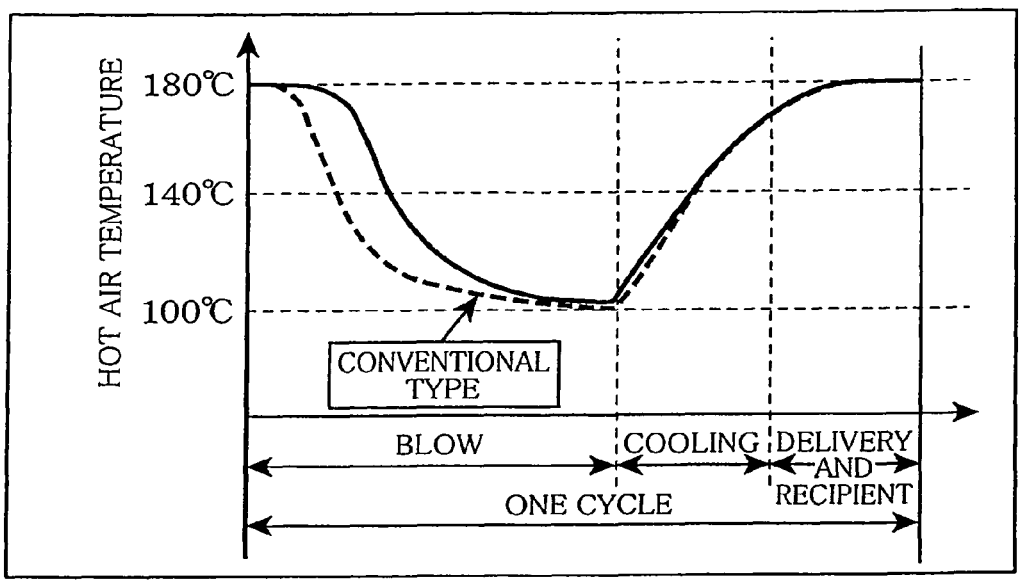
FIG. 12 is an explanatory drawing showing a temperature change pattern in the blow air supply unit for the blow molding machine according to the sixth embodiment of the present invention.
Figure 13:
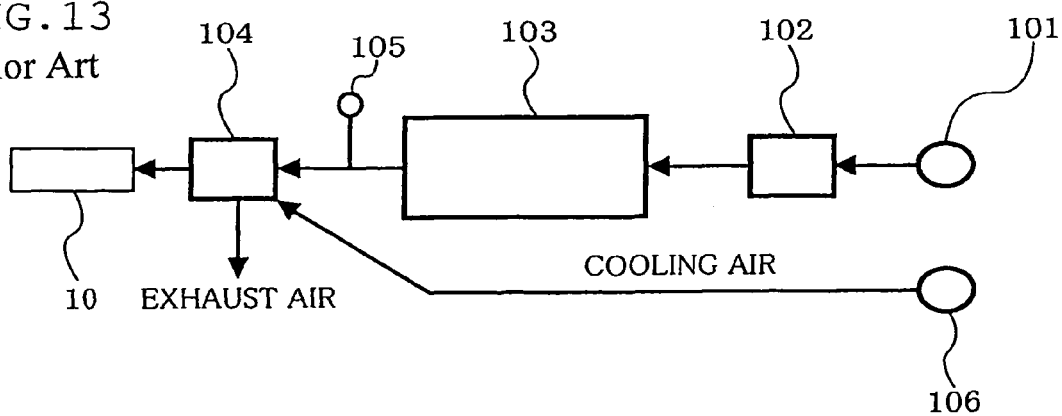
FIG. 13 is a block diagram showing a blow air supply unit for a blow molding machine according to a conventional example.

FIG. 12 is an explanatory drawing showing a temperature change pattern in the blow air supply unit for the blow molding machine according to the sixth embodiment of the present invention.

In the blow air supply unit according to the sixth embodiment, the blow air is gradually supplied through the first channel on the initial stage of blow. Then, the blow air pressure required to form a preform in a shape corresponding to a blow mold is supplied through the second channel to mold a bottle container. When this operation is performed, since the primary air source 11A is relatively set to a low pressure, a time required for the blow air, which is supplied from the primary air source 11A, to pass through the heat exchanger 13 becomes long. Therefore, as shown in FIG. 12, the blow air having a high temperature can be supplied for a long time on the initial stage of blow. Additionally, then, switching the channel to the second channel enables supplying the blow air from the secondary air source 11B, thereby increasing the pressure of the blow air. As a result, the blow air pressure required to form the perform, which is in the blow molding process, in a shape completely corresponding to a blow mold can be supplemented.

INDUSTRIAL APPLICABILITY

The present invention is applied to the blow air supply unit for the blow molding machine that molds a hollow container by supplying the heated blow air into the preform. In particular, the present invention is suitable for the blow air supply unit for the blow molding machine that is used to mold a container which has a reduced strain of an inner surface and is superior in heat resistance.

The invention claimed is:

1. A blow air supply unit for a blow molding machine, which supplies heated blow air into a preform to mold a hollow container, comprising:
   a high-pressure air source which generates blow air having a high pressure;
   a high-pressure gate valve which opens/closes a blow air channel on the downstream side of the high-pressure air source;
   a heat exchanger which heats the blow air on the downstream side of the high-pressure gate valve;
   a throttle valve which throttles a blow air flow rate on the downstream side of the heat exchanger; and
   a switchover valve which switches the blow air channel on the downstream side of the throttle valve.

2. A blow air supply unit for a blow molding machine, which supplies heated blow air into a preform to mold a hollow container, comprising:

a high-pressure air source which generates blow air having a high pressure;

a heat exchanger which heats the blow air on the downstream side of the high-pressure air source;

a high-pressure gate valve which opens/closes a blow air channel on the downstream side of the heat exchanger; and a switchover valve which switches the blow air channel on the downstream side of the high-pressure gate valve, wherein a throttle valve which throttles a blow air flow rate is provided between the high-pressure gate valve and the switchover valve.

3. A blow air supply unit for a blow molding machine, which supplies heated blow air into a preform to mold a hollow container, comprising:

a high-pressure air source which generates blow air having a high pressure;

a heat exchanger which heats the blow air on the downstream side of the high-pressure air source;

a high-pressure gate valve which opens/closes a blow air channel on the downstream side of the heat exchanger; and a switchover valve which switches the blow air channel on the downstream side of the high-pressure gate valve, wherein a first gate channel provided with the high-pressure gate valve and a throttle valve in series, and a second gate channel provided with the high-pressure gate valve are arranged in parallel between the heat exchanger and the switchover valve.

4. The blow air supply unit for a blow molding machine according to claim 2, wherein a first gate channel and a second gate channel are switched in such a manner that the blow air is supplied through the first gate channel on an initial stage of blow and then the blow air is supplied through the second gate channel.

5. A blow air supply unit for a blow molding machine, which supplies heated blow air into a preform to mold a hollow container, comprising:

a high-pressure air source which generates blow air having a high pressure;

a heat exchanger which heats the blow air on the downstream side of the high-pressure air source;

a high-pressure gate valve which opens/closes a blow air channel on the downstream side of the heat exchanger; and a switchover valve which switches the blow air channel on the downstream side of the high-pressure gate valve, wherein a second heat exchanger which heats the blow air is provided between the high-pressure gate valve and the switchover valve.

6. A blow air supply unit for a blow molding machine, which supplies heated blow air into a preform to mold a hollow container, comprising:

a first channel including a primary high-pressure air source which generates blow air having a high pressure and a high-pressure gate valve which opens/closes a blow air channel on the downstream side of the primary high-pressure air source;

a second channel including a secondary high-pressure air source which generates blow air having a pressure higher than that of the primary high-pressure air source and a high-pressure gate valve which opens/closes the blow air channel on the downstream side of the secondary high-pressure air source;

a heat exchanger which heats the blow air on the downstream side of the first channel and the second channel which are connected in parallel; and a switchover valve which switches the blow air channel on the downstream side of the heat exchanger, wherein the first channel and the second channel are switched in such a manner that the blow air is supplied through the first channel on an initial stage of blow and then the blow air is supplied through the second channel.

7. The blow air supply unit for a blow molding machine according to claim 2, wherein a second heat exchanger which heats the blow air is provided between the throttle valve and the switchover valve.

\* \* \* \* \*